(12) United States Patent
Nutsos

(10) Patent No.: US 7,597,269 B2
(45) Date of Patent: Oct. 6, 2009

(54) WATER CIRCULATION UNIT

(76) Inventor: Mikael Nutsos, Önnemovägen 73, S-146 53 Tullinge (SE)

( * ) Notice: Subject to any disclaimer, the term of this patent is extended or adjusted under 35 U.S.C. 154(b) by 580 days.

(21) Appl. No.: 10/536,314

(22) PCT Filed: Nov. 25, 2003

(86) PCT No.: PCT/SE03/01826

§ 371 (c)(1),
(2), (4) Date: Nov. 4, 2005

(87) PCT Pub. No.: WO2004/048856

PCT Pub. Date: Jun. 10, 2004

(65) Prior Publication Data

US 2006/0151622 A1  Jul. 13, 2006

(30) Foreign Application Priority Data

Nov. 26, 2002 (SE) .................................... 0203502

(51) Int. Cl.
*G05D 23/13* (2006.01)

(52) U.S. Cl. ............... 236/12.12; 236/12.13; 236/12.15

(58) Field of Classification Search ............. 236/12.12, 236/12.13, 12.1, 12.11, 12.15; 137/1, 563, 137/337; 417/32; 126/362.1
See application file for complete search history.

(56) References Cited

U.S. PATENT DOCUMENTS

| | | | | | |
|---|---|---|---|---|---|
| 3,776,261 | A | * | 12/1973 | Houghton | 137/337 |
| 4,672,990 | A | * | 6/1987 | Robillard | 137/59 |
| 4,870,986 | A | * | 10/1989 | Barrett et al. | 137/119.1 |
| 4,945,942 | A | * | 8/1990 | Lund | 137/337 |
| 5,050,640 | A | * | 9/1991 | Cowley | 137/606 |
| 5,261,443 | A | * | 11/1993 | Walsh | 137/337 |
| 5,577,660 | A | * | 11/1996 | Hansen | 236/12.12 |
| 6,039,067 | A | * | 3/2000 | Houlihan | 137/337 |
| 6,182,683 | B1 | * | 2/2001 | Sisk | 137/337 |

FOREIGN PATENT DOCUMENTS

| | | | |
|---|---|---|---|
| EP | 0390336 | | 10/1990 |
| GB | 2267664 | | 12/1993 |
| GB | 2365102 | A * | 2/2002 |
| SE | 0102604-6 | | 3/2003 |

* cited by examiner

*Primary Examiner*—Marc E Norman
(74) *Attorney, Agent, or Firm*—Young & Thompson

(57) ABSTRACT

A water circulation unit (120) for reducing bacteria growth in a water supply system includes elements for controlling temperature and flow (133) which is arranged to provide a dynamically controlled flow of water from both a hot water pipe (140) and a cold water pipe (150) to at least one return water pipe (160) such that the water from the hot water pipe is above the temperature region in which dangerous bacteria growth may occur, and the water from the cold water pipe (150).

17 Claims, 4 Drawing Sheets

WATER CIRCULATION UNIT

The present invention relates to a water circulation unit and a tap water network effectively impeding bacterial growth in the water network. In particular, the present invention relates to a water circulation unit adapted for mounting to or adjacent to a water tapping point.

BACKGROUND OF THE INVENTION

Growth of water-borne bacteria in supply water networks and tapping points is a well recognized problem. Especially feared are the legionella bacteria that can grow rapidly to dangerous levels in the water at temperatures between 20 and 50° C. Hot water flushing or a biocide may effectively kill free-living bacteria in the water, but in the biofilm on the inner surfaces of water tanks, pipes and fittings the bacteria will often survive and start to multiply again as soon as conditions allow it. This capability of "hiding" makes certain bacteria e.g. legionella very difficult to effectively control. The problem is particularly serious in large buildings, such as hospitals, hotels and apartment buildings, the tap water systems of which have many spaces in which at times stagnant water is cooled down or warmed up to the hazardous temperature region between 20 and 50° C.

Recent attempts to address this problem have included mixers where an operator can use a special tool to temporarily flush the mixer and the whole water supply system with scalding hot water for several minutes with the aim of killing the bacteria during a round of all the tapping points in a hospital or care establishment, for example. A computer-controlled automated system for the regular flushing of tap water systems with hot water through the tapping devices has also been suggested. Further experience has shown that sanitizing effects are achieved by continuously supplying the water with oxidising biocides such as chlorine, bromine or ozone. Flushing methods are taught in e.g. U.S. Pat. No. 6,027,572 and references therein. However, all such procedures imply a great deal of manual labour and consequently high costs for the service operator in, for example, a hospital. In addition, the activities in the building will be disrupted.

Other attempts of addressing the bacteria problem is by purifying the water in, or close to, the tapping device. Methods and devices include adding ozone (U.S. Pat. No. 5,942,125), using multiple filters (U.S. Pat. No. 5,851,388), adding bactericidal agent through a pumping device (U.S. Pat. No. 5,709,546) and sterilization by UV radiation (U.S. Pat. No. 5,891,329). Although effective in certain applications e.g. in dental units, their complexity and need for maintenance make them less suitable for large-scale installation such as every tapping device in a hospital or an apartment building. Also the principle of purifying water at a late stage and not addressing the problem of the growth of bacteria in the whole tap water system could be questioned.

In U.S. Pat. No. 6,021,803, by the same applicant as in the present invention the problem of legionella bacteria is addressed by providing a tapping point including a mixer for hot and cold water, with a hot water and a cold water inlet, and a hot water and a cold water space. To impede the growth of especially legionella bacteria within the mixer it is suggested that the mixer additionally is provided with a hot water outlet from the hot water space of the mixer. The outlet is connected to a hot water return pipe and through an arrangement of valves the hot water is always kept under circulation. This will assure that the water will not cool down to the hazardous temperature region between 20 and 50° C. Thermally insulated return pipes for hot water are, in fact, normally already installed as a part of the water mains of large buildings, whereby in such cases, return pipes only need to be furnished from each tapping point to the main return pipe. This will keep the installation and maintenance cost at a reasonable level. The cold water may be circulated by a similar arrangement comprising a cold water return pipe. Spaces within the tapping point, in which it is not possible to circulate water, are evacuated whenever the tapping point is not in use.

Swedish patent nr 517,749 teaches a method and apparatus of reducing bacterial growth in a water mixer by utilizing the method of U.S. Pat. No. 6,021,803 on the hot water side in combination with a device locally circulating the water on the cold water side. If required the cold water is additionally cooled by some cooling device. The additional cooling is controlled by a temperature sensor.

The water mixer of Swedish patent nr 517,749 will, in comparison with traditional water mixers/tapping points, be complicated and typically require regular maintenance. The equipment will therefore be costly both to install and maintain. The temperature sensor and the cooling device will typically require electricity and/or gas. An electrical installation, for example, has obvious drawbacks in for example a shower.

Thus there is a demand for methods and apparatus for preventing bacteria growth that can work with conventional water mixers/tapping points as well existing supply water networks.

SUMMARY OF THE INVENTION

The objective problem is to provide a method and an apparatus for reducing the risk of bacteria growth, especially legionella bacteria growth, in a water supply network. In particular to provide an apparatus and a method that can be used with existing water supply networks and conventional water mixers/tapping points.

The problem is solved by the apparatus and the method as defined in the claims.

In order to achieve the above-mentioned object, according to the invention, a water circulation unit is provided that allows circulation of hot water and circulation of cold water. By circulating the hot and cold water, respectively, all parts of the system may be kept at temperatures above or below, respectively, the temperature region in which bacteria growth occur. In addition the return water may be kept at a temperature outside the dangerous region.

A realization of the water circulation unit according to the invention comprises means for controlling temperature and flow which are arranged to provide dynamically controlled flows of water from both a hot water pipe and a cold water pipe to at least one return water pipe such that the water from the hot water pipe is above a first predefined temperature and the water from the cold water pipe is below a second predefined temperature. The dynamic control should be based on temperature. The means for controlling temperature and flow may preferably be thermostatically controlled valves or a thermostat.

Thanks to the inventive water circulation unit it is possible to construct a water network with continuous circulation of hot and cold water in all parts of the network. Parts not suitable to circulate with hot or cold water could be evacuated and ventilated.

Thanks to the inventive water circulation unit it is possible to sanitize cold water parts of the water supply system by flushing these parts with hot water.

BRIEF DESCRIPTION OF THE DRAWINGS

The invention will now be described in detail with reference to the drawing figures, in which FIG. 1a) is a schematic view of the water circulation unit according to the invention, b) the water circulation unit according to the invention mounted between a thermostatic water mixer and the water supply network, and c) the water circulation unit according to the invention between a pair of individual tapping points for hot and cold water, and the water supply network.

DETAILED DESCRIPTION OF THE INVENTION

Figure 1A:
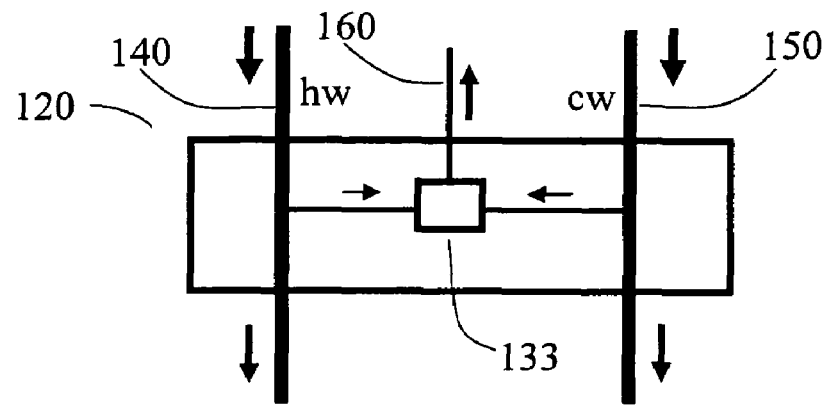

The principle of the present invention will be described with reference to the schematic illustration of FIG. 1a. The Water Circulation Unit (WCU) 120 according to the present invention is installed in a water supply system and provides circulation of hot water (hw) from a hot water pipe 140 to a return water pipe 160 and circulation of cold water (cw) from a cold water pipe 150 to the same return water pipe 160. Means for controlling temperature and flow 133 of the return water controls the flow of water from the cold and hot water pipes 150, 140 to the return water pipe 160. The means for controlling temperature and flow 133 should be adjusted to always give a flow of water both from the hot water pipe 140 and the cold water pipe 150. By keeping a continuous flow of both hot and cold water all the way up to and through the WCU, bacteria growth is reduced by that the hot water will not cool down to the dangerous temperature region, and the cold water will not heat up to the dangerous temperature region. The arrows in the drawing indicates the flow of water from the hot and cold water pipe, respectively to the return water pipe. The means for controlling temperature and flow 133 is typically adjusted to give a larger flow of hot water (larger arrows) and a smaller flow of cold (smaller arrows). The temperatures are preferably adjusted so that the temperature of the return water is between the temperature of the hot and cold water, but closer to the temperature of the hot water. If, for example the hot water is 60° C. and the cold water is 10° C., an appropriate temperature for the return water would be around 57° C.

Figure 1B:
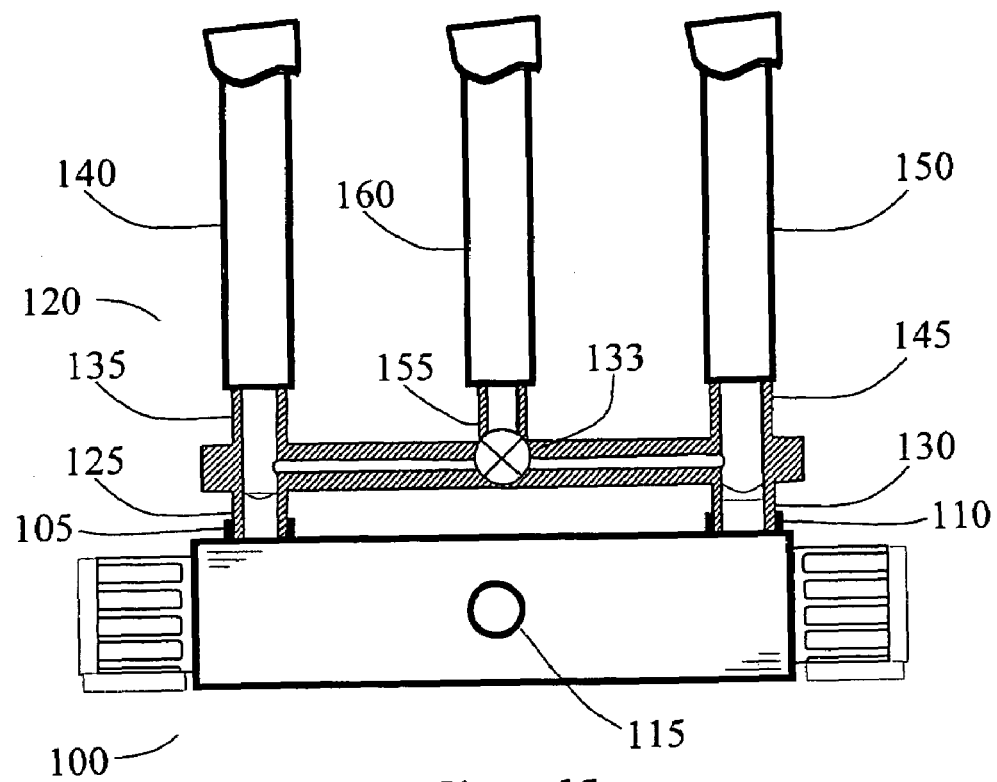

The principle of the invention is realized in the WCU depicted in the schematic drawing of FIG. 1b. In FIG. 1b a water mixer or tapping point 100, comprising a hot water inlet 105, a cold water inlet 110 and a mixed water outlet 115 leading to a shower (not shown), for example, is connected to the water circulation unit 120 according to the present invention. The water circulation unit comprises a hot water outlet (WCU hot outlet) 125 which is connected to the hot water inlet 105 of the water mixer and a cold water outlet (WCU cold outlet) 130 connected to the cold water inlet 110 of the water mixer. The water circulation unit 120 further comprises a hot water inlet (WCU hot inlet) 135 connected to a hot water pipe 140, a cold water inlet (WCU cold inlet) 145 connected to a cold water pipe 150 and a return water outlet (WCU return outlet) 155 connected to a return water pipe 160. The cold water, hot water and return water pipes are connected to cold water, hot water and return water mains, respectively (not shown).

The water circulation unit 120 according to the invention branches off a controlled portion of the water transported in the hot water pipe 140, the cold water pipe 150, or both, through the WCU return outlet 155 into the return water pipe. By that the water in both the hot water pipes and the cold water pipes can be kept outside of the temperature region (between 20 and 50° C.), in which dangerous bacteria growth may occur, even if the water mixer 100 is not in active use.

The water mixer 100 may be any kind of conventional water mixer or tapping device, for example a thermostat shower mixer. Preferably the mixer is constructed for minimizing bacteria growth. Such mixers are commercially available from for example AB Gustavsberg, Gustavsberg, Sweden, and relies upon the principle that spaces within the mixer are evacuated from water when the mixer is not in active use. The hot water pipe 140, and the cold water pipe 150 are the feeding pipes for supplying hot and cold water typically already installed and with standardized dimensions, water pressure etc. Large buildings normally have hot return water pipes in the mains, but not connections to them at the location of the tapping points.

Thus return water pipes from the location of the tapping points to the mains typically need to be installed. The purpose of the return water system has primarily been to keep the hot water in the mains under circulation and hence, keep the water in the mains hot, in order to be able to provide hot water at a tapping point at a reasonable time period after starting to flush the hot water. The hot water in the mains is kept at a predefined temperature, typically 50-55° C.

If WCUs according to the invention are installed in the water system a continuous addition of water to the return water system will occur i.e. from the circulation of the cold water. This addition of water might at times temporarily exceed the consumption of hot water in the system, and the excess water is then preferably kept in a storage tank, thereby balancing the fluctuations in supply and demand. The storage tank is preferably provided with a heater to ensure that the water temperature is not falling below a predetermined level. Alternatively, the excess water may be used in other facilities for example exchanging the water in a swimming pool.

However, the amount of excess water i.e. the flow of cold water in the individual WCU, should be kept at a minimum, in order to not put unnecessary high load on the return water system.

The return water should have a temperature outside the dangerous region, preferably well above, to prevent the bacteria growth. This put further requirements on the flow of water and under normal conditions a small flow of cold water is preferable.

To fulfill these demands, the means for controlling temperature and flow 133 of the WCU according to the invention, should be able to at the same time ensure a flow of hot water, a sufficient, but limited flow of cold water and keep the temperature of the return water at a essentially constant level well outside of the dangerous temperature region.

The water circulation unit 120 can for example be designed to be mounted directly adjacent to the water mixer, included in the wall-support that typically fixes a shower mixer to the wall, built-in into the wall. Such variations should be apparent to the skilled in the art.

Figure 1C:
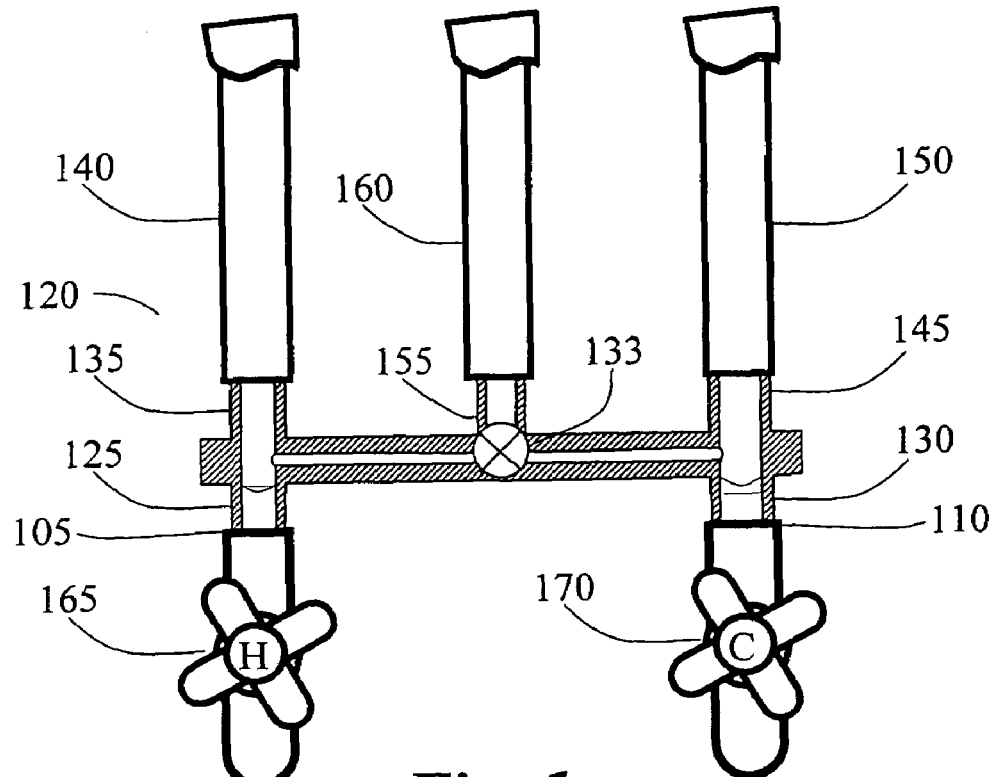

The water circulation unit 120 according to the present invention has here been described mounted to a thermostat water mixer. This should be considered as a non-limiting example of the use of the present invention. The water circulation unit 120 may advantageously be used in combination with other types of water mixers and water faucets. One example thereof is illustrated in FIG. 1c, in which the water circulation unit 120 is connected to a pair of individual faucets, for hot 165 and cold 170 water, respectively. An arrangement typically found in traditional bathtubs and sinks. The water circulation unit 120 could in this example be placed beneath the frame of the bathtub or sink.

Figure 2A:
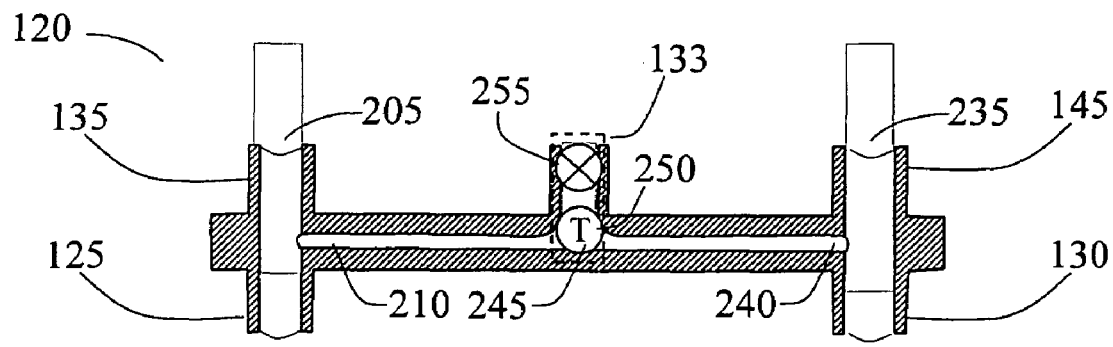
FIG. 2a) is a cross sectional view of a preferred embodiment of the water circulation unit according to the invention, and b) a cross sectional view of a further embodiment of the water circulation unit according to the invention.

A preferred embodiment of the water circulation unit according to the invention is schematically depicted in FIG. 2a. A hot water channel 205 connects the WCU hot inlet 135 to the WCU hot outlet 125. A hot water passage 210 branches of from the hot water channel 205 and connects to the means for controlling temperature and flow 133 which in turn is connected to the WCU return outlet 155. Similarly a cold water channel 235 connects the WCU cold inlet 145 to the WCU cold outlet 130. A cold water passage 240 branches off from the cold water channel 235 and connects to the means for controlling temperature and flow 133. The means for controlling temperature and flow 133 is here realized by a thermostat valve 250 and optionally flow adjustment valve 255. The thermostat valve 250 is preferably of the same type of valve that controls the temperature of the outgoing water in a thermostat mixer i.e. automatically adjust the volume of hot and cold water to give the outgoing water an essentially constant temperature corresponding to the settings of the thermostat valve. The thermostat valves may have one predefined temperature of the outgoing water or a possibility to set the temperature. Such thermostat valves are commercially available in large variety of shapes, sizes, temperature regions etc.

The thermostat valve 250 will ensure that the temperature of the water in the return water outlet 155 is essentially constant by increasing the flow of warm water from the hot water channel 205 via the hot water passage 210 if the return water is too cool, and increase the flow of cold water from the cold water channel 235 via the cold water passage 240 if the return water is too warm. The water flow adjustment valve 255 will define a maximum flow of water in the return water outlet 155. Alternatively, the hot and cold water passages may be provided with individual flow adjustment valves, which maximize the flow of hot and cold water, respectively, and in combination define a maximum total flow of water in the return water outlet 160.

The thermostat valve 250 also has to ensure that the hot water is always above, and the cold water is always below the dangerous temperature region, i.e. ensure a continuous and sufficient flow of both hot and cold water. This is achieved by setting the temperature of the thermostat valve 250 at an appropriate value, or choosing an appropriate valve if a thermostat valve with a fix temperature setting is used, compared to the temperatures of the hot and cold water. By setting (choosing) the thermostat valve 250 to a temperature between the temperature of the hot and cold water, but closer to the temperature of the hot water, the flow of hot water will in most instances be larger than the flow of cold water, which is according to the above stated preferences. Since the hot water in the supply system is subjected to reheating and circulation in the mains the temperature of the hot water will be roughly constant. It is recommended to keep the temperature of the hot water around 60° C. The temperature of the supplied cold water will typically vary more than the supplied hot water. The variations arising from the level of consumption of cold water in the system and outside factors such as the surrounding temperature. The cold water is for example often considerably cooler a cool winter day than a hot summer day. The thermostat valve 250 will account for the fluctuations by increasing the flow of cold water if the cold water is "warm" and decrease the flow if it is "cold". This is in accordance with the requirements of both keeping the temperature of the cold water below the dangerous temperature region and to limit the flow of cold water.

If, for example the hot water is 60° C. and the cold water is 10° C., an appropriate setting for the thermostat valve 250 would be around 57° C. The flow of hot water will be larger than the flow of cold water, which is desirable to keep the need of storage volume at an acceptable level, but circulation of cold water will be sufficient. The setting of the thermostat valve 250, or the choice of valve if valves with fixed temperature are used, and the adjustment of the flow adjustment valves 255, 265 will depend on the implementation, for example the temperatures of the hot and cold supply water, the facilities for temporary storing etc. The settings can for example be preset by the manufacturer and if needed adjusted during installation or regular maintenance. However, the settings should not be changed during normal operation.

Figure 2B:
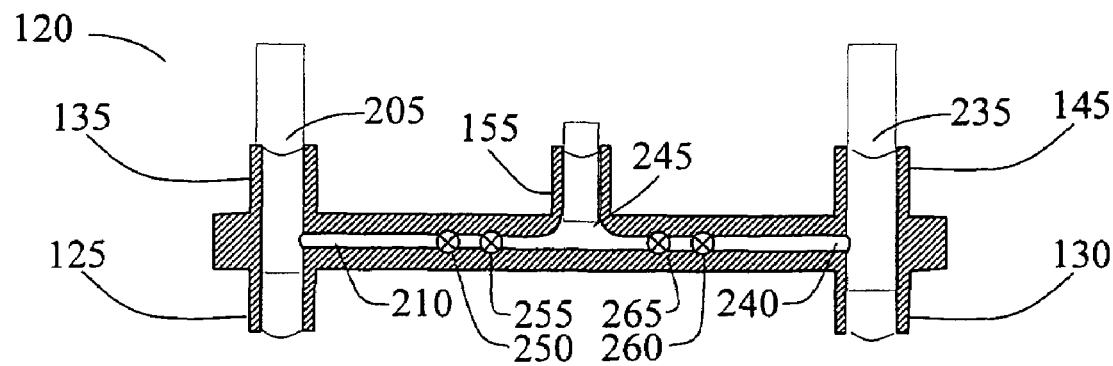

The means for controlling temperature and flow 133 may be realized in other ways than the above described. In a further embodiment of the invention, depicted in FIG. 2b, the means for controlling temperature and flow 133 is accomplished by an arrangement of valves which comprise hot and cold flow adjustment valves 255, 265 and hot and cold thermostatically controlled valve 250, 260, arranged in the respective hot and cold water passages 210, 240. The hot water thermostatically controlled valve 250, for example a bi-metal valve, is arranged to be closed if the temperature of the water in the hot water passage 210 is above a predefined threshold value, the hot water threshold value, and open if the temperature of the water is below the hot water threshold value. The hot water threshold value should be over the upper value of the temperature region for hazardous bacteria growth, typically 60° C.±3° C. The hot water adjustment valve 255 defines the maximum flow of water in the hot water passage 210, and is preferably adjustable from the outside of the water circulation unit 120.

The cold water thermostatically controlled valve 260, for example a bi-metal valve, is arranged to be closed if the temperature of the water in the cold water passage is below a predefined threshold value, the cold water threshold value, and open if the temperature of the water is above the cold water threshold value. The cold water threshold value must be lower than the lowest value of the temperature region for hazardous bacteria growth, typically 16° C. ±2° C. The cold water adjustment valve 255 defines the maximum flow of water in the cold water passage 240, and is preferably adjustable from the outside of the water circulation unit 120.

Flow adjustment valves and thermostatically controlled valves suitable for the present invention are commercially available in a large number of variations. As should be apparent for the skilled in art, the details of the valve arrangements can be varied and still be within the scoop of the invention.

If the water in the hot water passage 210 cools down to a temperature below the hot water threshold, typically due to that the water mixer 100 has not been in use for a time period, the hot water thermostatically controlled valve 250 will open. A circulation of hot water from the hot water pipe 140 through the hot water passage 210, to the return water pipe 160 will occur. The temperature of the water and the surrounding material will rise to, or above, the hot water threshold value and the hot water thermostatically controlled valve 250 will then close again. The inherent hysteresis and slowness of for example a bi-metal valve will prevent the valve from rapidly switching on and off, and circulation will occur for a significant period of time. The hot water threshold value should be chosen so that the temperature of the hot water never is in the hazardous region and all fluctuations of the water temperature are above the hazardous region.

Similarly, If the water in the cold water passage 240 warms up to a temperature above the cold water threshold, typically due to that the water mixer 100 has not been in use for a time period, the cold water thermostatically controlled valve 260 will open. A circulation of cold water from the cold water pipe 150 through the cold water passage 240, to the return water pipe 160 will occur. The temperature of the water and the surrounding material will cool to the cold water threshold value and the cold water thermostatically controlled valve 260 will then close again. The inherent hysteresis and slowness of for example a bi-metal valve will prevent the valve from rapidly switching on and off, and circulation will occur for a significant period of time. The cold water threshold value should be chosen so that the temperature of the cold water never is in the hazardous region and all fluctuations of the water temperature are below the hazardous region. The thermostatically controlled valves 260, will through the heat transfer in the material of the WCU 120 affects each other and a reasonably steady state situation will occur in which a continuous flow of both hot and cold water may be achieved.

In order to effectively impede bacterial growth, water standing still, and hence cooling down or warming up to the hazardous temperature region, should be carefully avoided. The water circulation unit according to the invention should therefore preferably be combined with a water mixer/tapping point that automatically evacuate all water spaces then not in use, or disinfect its interior with other means. To enhance the circulation in the spaces formed between the water passages 210, 240 entrance to the water channels 205, 235 and water mixer inlets 105, 110, the distance between the water passages 210, 240 entrance to the water channels 205, 235 and water mixer inlets 105, 110 should be as short as possible. Preferably the water mixer/tapping points has valves closing off the cold and hot inlet water as close as possible to the inlets 105, 110, which are connected to the water circulation unit outlets 125, 130.

Figure 3:
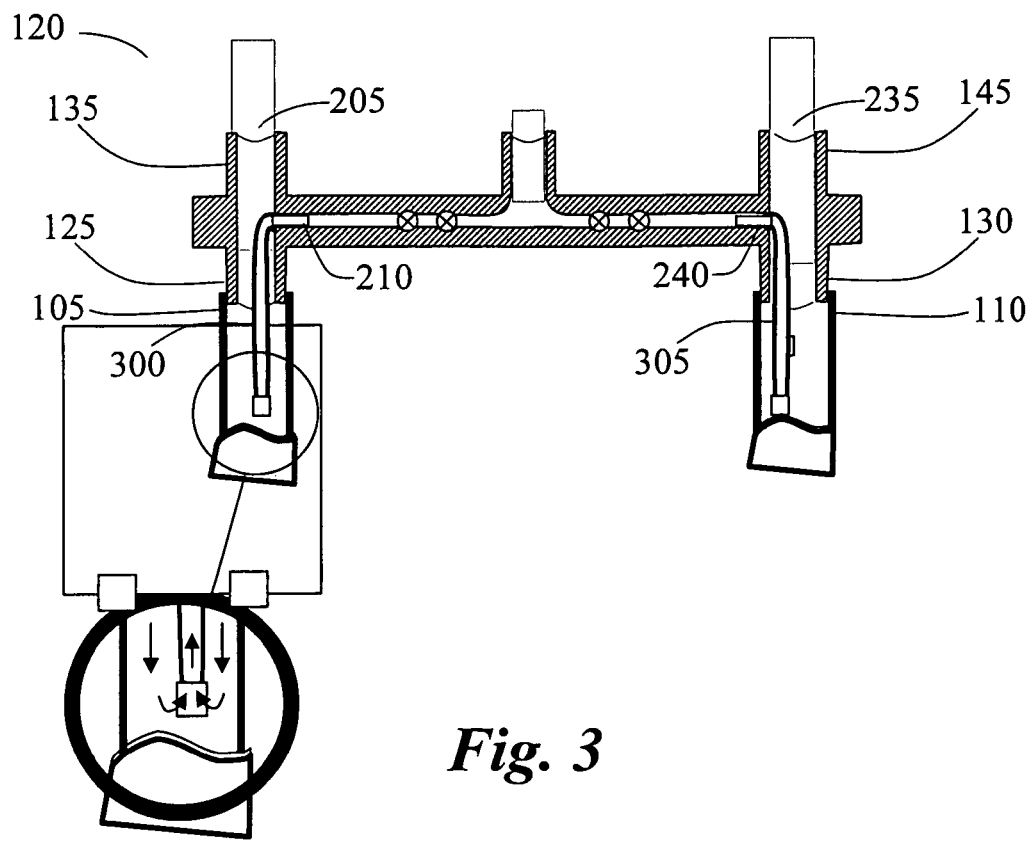
FIG. 3 is a cross sectional view of yet another embodiment of the water circulation unit according to the invention.

In one embodiment of the present invention, described with reference to FIG. 3, the circulation close to the water mixer is further enhanced. The hot water passage 210 is in this embodiment joined to a hot water circulation tube, 300, extending from the hot water passage 210 into the hot water channel 205 towards the WCU hot outlet 125. In the same manner the cold water passage 240 is joined to a cold water circulation tube, 305, extending from the cold water passage 240 into the hot water channel 205 towards the WCU cold outlet 130. The circulation of water will by this arrangement be effective in all parts of the water channels 205, 235. If suitable, with regards to the design of the water mixer, the circulations tubes 300, 305 may extend beyond the water circulation unit outlets 125, 130 and a distance into the water mixer inlets 105, 110. The appropriate distance will depend on the design of the water mixer, and may readily be adapted, for example by cutting the tubes in appropriate lengths, upon installation of the water circulation unit. Other types of "tube in tube" arrangement could be used in the same manner. For example may the parts of the water channels from the water passages and towards the WCU outlet be longitudinally divided into two parts.

By this arrangement the water circulation unit 120 according to the invention will provide circulation, and hence a possibility to avoid the hazardous temperature region also very close to the water mixer/tapping point to which the water circulation unit is connected. The enlarged section of FIG. 3 illustrates, with arrows, how water will flow around the end of the circulation tubes.

Figure 4:
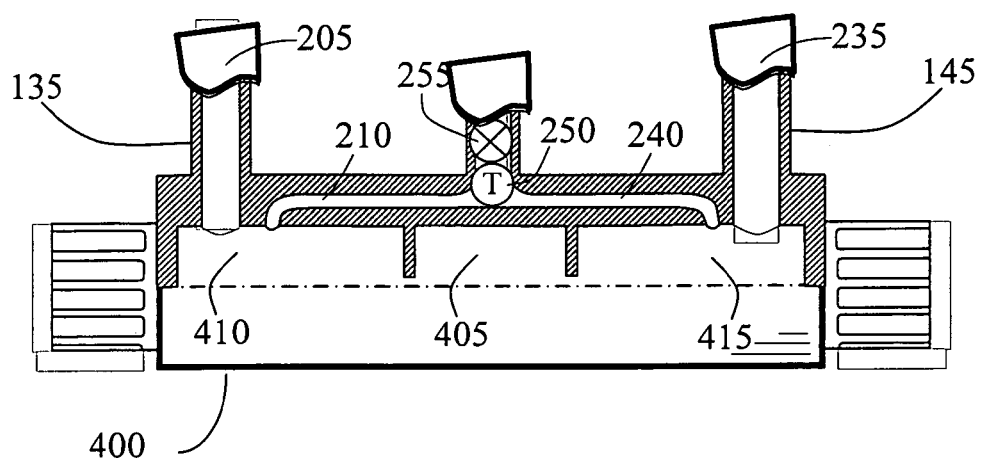
FIG. 4 is a partly cross sectional view of an embodiment of the water circulation unit provided within a mixer housing.

The principles of the present invention can be utilized also within a water mixer or tapping point by incorporating the WCU 120 in the mixer housing and optionally integrate it with the design of the water mixer. This embodiment of the invention is illustrated in FIG. 4 in which a water mixer 400 comprising a hot water chamber 410, a cold water chamber 415 and a mixer chamber 405 is depicted. As illustrated the hot and cold water passages 210 and 240 are provided in the wall of the mixer housing. The thermostat valve 250 is as before connected to the hot and cold water passages and the flow adjustment valve 255 at the return water outlet 155. The hot and cold water passages 210, 240 may as before be connected to the water channels 205, 235, but may preferably be connected to the hot and cold water chamber, respectively, in order to provide circulation also in these chambers. The functionality of the thermostat valve 250 will be in accordance with previous embodiments.

The invention has in the foregoing embodiments been described with the means for controlling temperature and flow 133 comprising purely mechanical members, utilizing the physical effect of thermal expansion to control the temperature of the outgoing return water. These are preferred embodiments since such systems does not require any electrical power and generally very little or no maintenance. However, as appreciated by the skilled in the art, means for controlling temperature and flow 133 may also be realized in other ways, for example by the use of a sensor for measuring the temperature, electrically powered flow control valves and control electronics for adjusting the valves in response to the measuring of the sensor.

The cooling of the cold parts of the water supply system afforded by the invention will effectively reduce the bacteria growth, but the cooling will not kill the bacteria. In the hot parts, if the water is sufficiently hot, the bacteria will be killed. If needed, thanks to the present invention, also the cold parts may be flushed with hot water by temporarily couple hot water to the cold water system and optionally cold water to the hot water system. Conventional thermostat valves will react to the reversed temperature situation by allowing maximum flow from the cold water passage (now with hot water). In the embodiment utilizing bi-metal valves the effect will be the same. This will provide for a effective sanitation of the cold water parts. Some thermostat valves are not sensitive to which connection the hot and cold water is connected to and hence, will function equally well with reversed cold and hot water. This inventive method of sanitizing is particularly useful before opening an establishment that has been temporarily closed, for example a season hotel.

In the here described preferred embodiment the hot water passage 210 and the cold water passage 240 are connected to the same return water pipe. They could equally well be connected to individual return water pipes, in which case the return water typically should be re-cooled before it is brought back to the cold water supply mains. This is often the case in for example very tall buildings, wherein the cold water is circulated in the mains in the same manner as the more common hot water circulation. The water circulation unit according to the invention can easily be adapted to function also in such systems. Such as an adaptation is schematically depicted in FIG. 5a, and a realization of a WCU suitable for individual hot and cold water return pipes are illustrated in FIG. 5b.

Figure 5A:
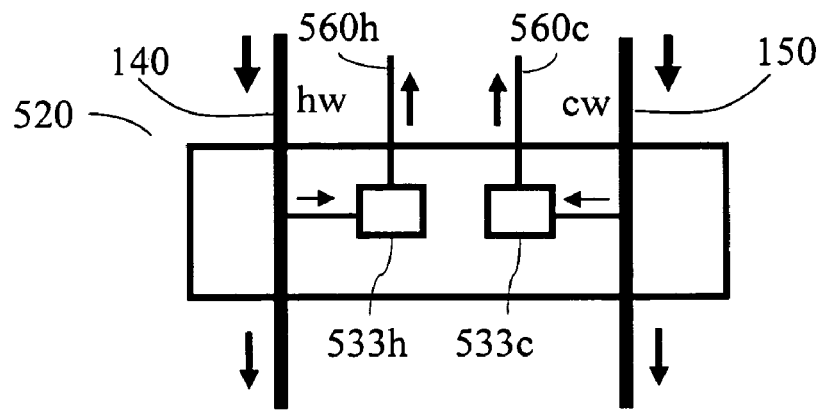
FIG. 5a) is a schematic view of the water circulation unit according to one embodiment of the invention, and b) is a cross sectional view of the embodiment.

Illustrated in FIG. 5a is the water circulation Unit (WCU) 520 according to this embodiment of the present invention, installed in a water supply system and provides circulation of hot water (hw) from a hot water pipe 140 to a hot water return pipe 560h and circulation of cold water (cw) from a cold water pipe 150 to a cold water return pipe 560c. Means for controlling temperature and flow 533h and 533c, for the hot and cold water, respectively, of the return water, controls the flow of water from the cold and hot water pipes 150, 140 to the return water pipes 560h and 560c, respectively. The means for controlling temperature and flow 533h and 533c should preferably dynamically adjust the flow of water from the hot water pipe 140 and the cold water pipe 150, to ensure that the temperature of the hot water never falls below a predefined hot water value, respectively to ensure that the temperature of the cold water never exceeds a predefined cold water value. The bacteria growth is reduced by that the hot water will not cool down to the dangerous temperature region, and the cold water will not heat up to the dangerous temperature region. The arrows in the drawing indicates the flow of water from the hot and cold water pipe, respectively to the respective return water pipes.

Figure 5B:
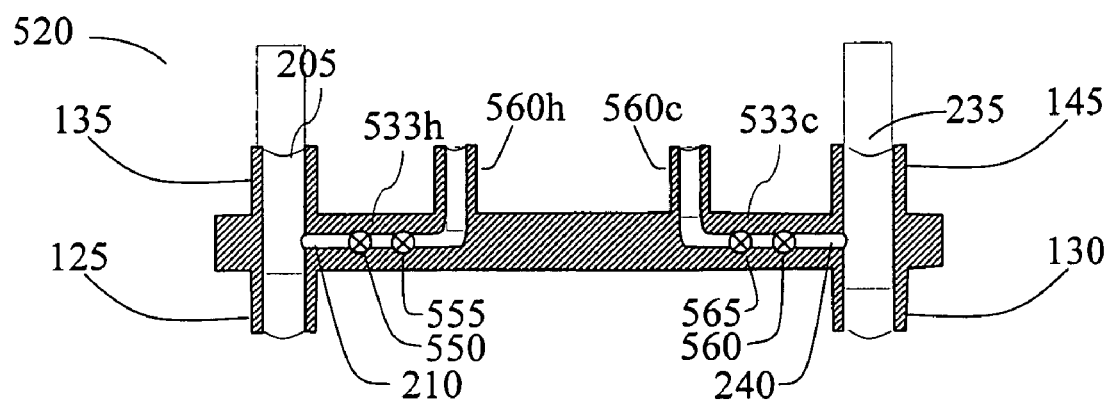

A realization of this embodiment of the present embodiment invention is schematically depicted in FIG. 5b. A hot water channel 205 connects the WCU hot inlet 135 to the WCU hot outlet 125. A hot water passage 210 branches off from the hot water channel 205 and connects to hot water means for controlling temperature and flow 533h which in turn is connected to the hot water return outlet 155. Similarly a cold water channel 235 connects the WCU cold inlet 145 to the WCU cold outlet 550. A cold water passage 240 branches off from the cold water channel 235 and connects to cold water means for controlling temperature and flow 533c. The means for controlling temperature and flow 533c and 533h comprises, for example, an arrangement of valves which comprise hot and cold flow adjustment valves 555, 565 and hot and cold thermostatically controlled valves 550, 560, arranged in the respective hot and cold water passages 210, 240. The hot water thermostatically controlled valve 250, for example a bi-metal valve, is arranged to be closed, or to provided a small flow, if the temperature of the water in the hot water passage 210 is above a predefined threshold value, the hot water threshold value, and to open up if the temperature of the water falls below the hot water threshold value. The hot water threshold value should preferably be over the upper value of the temperature region for hazardous bacteria growth, typically 60° C.±3° C. The hot water adjustment valve 555 defines the maximum flow of water in the hot water passage 210, and is preferably adjustable from the outside of the water circulation unit 520.

The cold water thermostatically controlled valve 560, for example a bi-metal valve, is arranged to be closed, or to provided a small flow, if the temperature of the water in the cold water passage is below a predefined threshold value, the cold water threshold value, and open up if the temperature of the water is above the cold water threshold value. The cold water threshold value must be lower than the lowest value of the temperature region for hazardous bacteria growth, typically 16° C.±2° C. The cold water adjustment valve 565 defines the maximum flow of water in the cold water passage 240, and is preferably adjustable from the outside of the water circulation unit 520. Hence, a dynamic control, based on water temperature, of the flow and/or the temperature of both the hot and cold water is achieved, which ensures that regardless of fluctuations of the temperature of the incoming water (within obvious limits), both the hot and cold water will be dynamically and automatically adjusted to in their respective "safe" temperature region. At the same time the flows of water to the return pipes are minimized, keeping water and/or energy consumption at a low level.

Dynamic control based on temperature may, as appreciated by the skilled in the art, be implemented in many different ways, including for example, the above described thermostatically controlled valves, different types of thermostats, systems comprising electronic sensors and electrically manoeuvred valves.

The water circulation unit 520 suitable for separated cold water return 560 and hot water return, has here above been depicted and described as a combined unit comprising both hot and cold water parts. Of course, the hot water circulation and the cold water circulation may be provided in two separate units, which can be mounted independently, preferably in close proximity to the mixer/faucets. This could be advantageous in certain applications, for example if separate faucets are used for hot and cold water, or if only a cold water, or a hot water faucet, is used at one location. Further, if for example, the mains provides hot water return only, separated water circulation units for hot water only according to the above embodiment, may advantageously be installed. Alternatively, if only cold water return is available, separated water circulation units for cold water only may be installed.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The invention claimed is:

1. A water circulation unit for reducing bacteria growth in a water supply system adapted for installation in proximity to a tapping point and in connection to a hot water pipe, a cold water pipe and a return water pipe, the water circulation unit comprising:
   a hot water channel leading from the hot water pipe to the tapping point;
   a hot water passage which branches off from the hot water channel and connects to the return water pipe;
   a cold water channel leading from the cold water pipe to the tapping point;
   a cold water passage which branches off from the cold water channel and connects to the return water pipe the hot and cold water passages configured to provide continuous circulation of water from the hot and cold water pipes to the return water pipe; and
   means for dynamically controlling water temperature and flow,
   the means for controlling temperature and flow configured to automatically control a flow of water from the hot water pipe and the cold water pipe to the return water pipe, and
   the means for controlling temperature and flow configured to be dependent at least on a water temperature in the return water pipe.

2. The water circulation unit according to claim 1, wherein the means for controlling temperature and flow is configured to be dependent on the water temperature in the return water pipe and a water temperature in the hot water passage, and a water temperature in the cold water passage.

3. The water circulation unit according to claim 2, wherein the means for controlling temperature and flow is configured to provide that water from the hot water pipe is above a first predefined temperature, that water from the cold water pipe is below a second predefined temperature, and that the water temperature in the return water pipe is at or above a third predefined temperature.

4. The water circulation unit according to claim 3, wherein the third predefined temperature provided by the means for controlling flow and temperature is configured to be in-between the first predefined temperature and the second predefined temperature.

5. The water circulation unit according to claim 4, wherein the third predefined temperature provided by the means for controlling flow and temperature is configured to be closer to the first predefined temperature than the second predefined temperature.

6. The water circulation unit according to claim 4, wherein the first predefined temperature is 60° C.±3° C.

7. The water circulation unit according to claim 4, wherein the second predefined temperature is 16° C.±2° C.

8. The water circulation unit according to claim 4, wherein the third predefined temperature is 57° C.

9. The water circulation unit according to claim 2, further comprising:
   a first hot water valve provided in the hot water passage; and
   a first cold water valve provided in the cold water passage,
   wherein the first hot water valve is configured to be open if a temperature of water in the hot water passage is below the first predefined temperature, and the first cold water valve in the cold water passage is configured to be open if a temperature of water in the cold water passage is above the second predefined temperature.

10. The water circulation unit according to claim 1, wherein the means for controlling temperature and flow is configured to be dependent on the water temperature in the return water pipe and a water temperature in the hot water passage.

11. The water circulation unit according to claim 1, wherein the means for controlling temperature and flow is configured to be dependent on the water temperature in the return water pipe and a water temperature in the cold water passage.

12. The water circulation unit according to claim 1, wherein the means for controlling temperature and flow comprises a thermostat valve.

13. A method in a water supply system for reducing bacteria growth in the water supply system, the method comprising the steps of:
   leading a portion of hot water passing in a hot water channel leading from a hot water pipe to a tapping point, via a hot water passage to a return water pipe;
   leading a portion of cold water passing in a cold water channel from a cold water pipe to the tapping point, via a cold water passage to the return water pipe;
   providing for continuous circulation of the hot water from the hot water pipe and of the cold water from the cold water pipe to the return water pipe; and
   dynamically controlling a flow of water from the hot water pipe and the cold water pipe to the return water pipe such that a temperature of water in the return water pipe is above a predefined value.

14. The method according to claim 13, wherein, in the step of controlling the flow of water, the hot water from the hot water pipe is above a first predefined temperature, the cold water from the cold water pipe is below a second predefined temperature, and the temperature of the water in the return water pipe is at or above a third predefined temperature.

15. The water circulation unit according to claim 14, wherein the first predefined temperature is 60° C.±3° C.

16. The water circulation unit according to claim 14, wherein the second predefined temperature is 16° C.±2° C.

17. The water circulation unit according to claim 14, wherein the third predefined temperature is 57° C.

* * * * *

UNITED STATES PATENT AND TRADEMARK OFFICE
CERTIFICATE OF CORRECTION

PATENT NO. : 7,597,269 B2
APPLICATION NO. : 10/536314
DATED : October 6, 2009
INVENTOR(S) : Mikael Nutsos It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 979 days.

Signed and Sealed this

Twenty-eighth Day of September, 2010

David J. Kappos
*Director of the United States Patent and Trademark Office*